March 13, 1945. O. H. PEARSON 2,371,466
CONTROL MECHANISM FOR PRESSING MACHINES
Filed Oct. 4, 1941 5 Sheets-Sheet 3
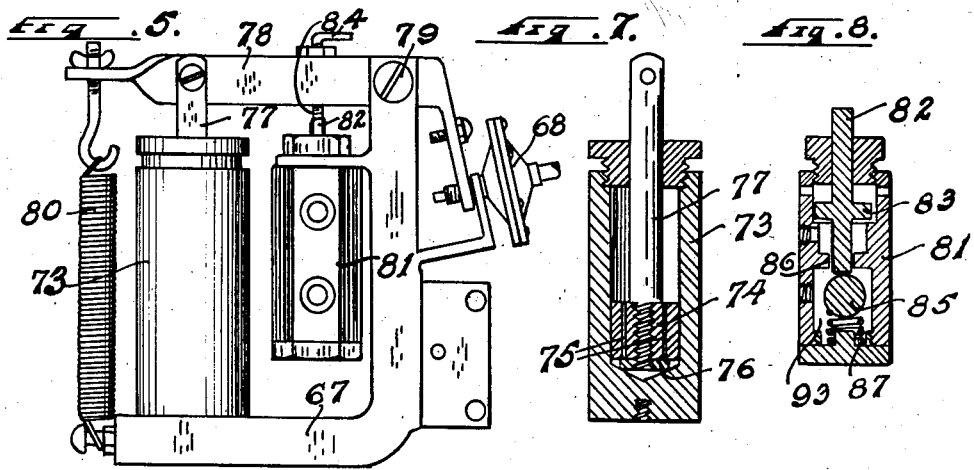
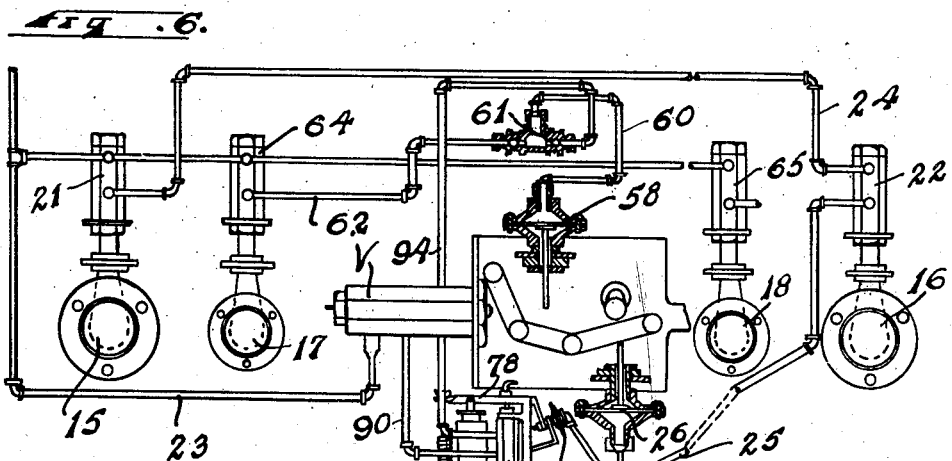
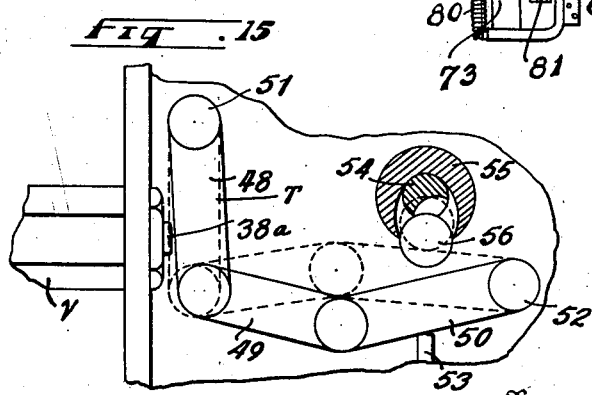
Inventor
Otto H. Pearson
By R. M. Thomas
Attorney

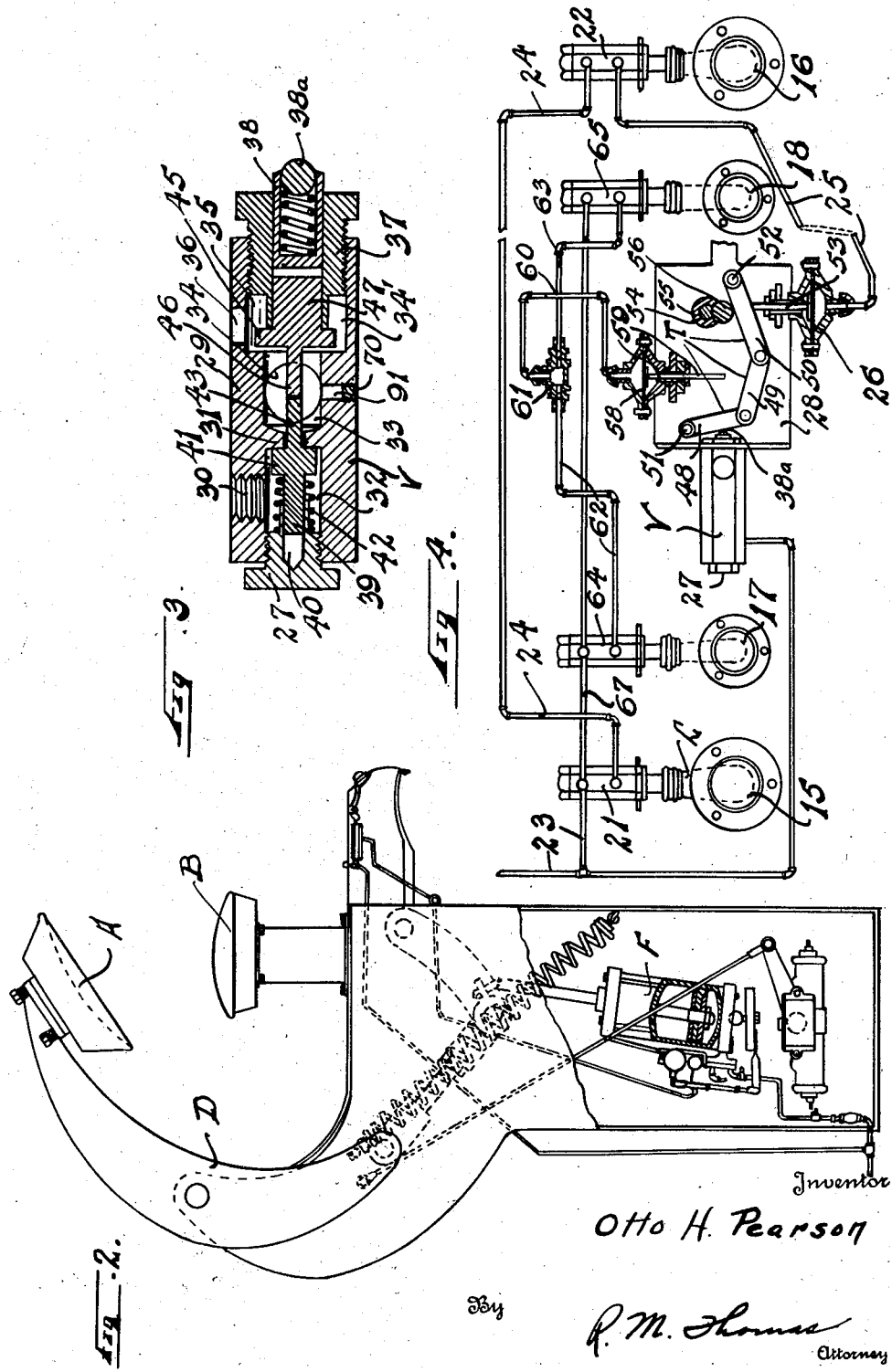

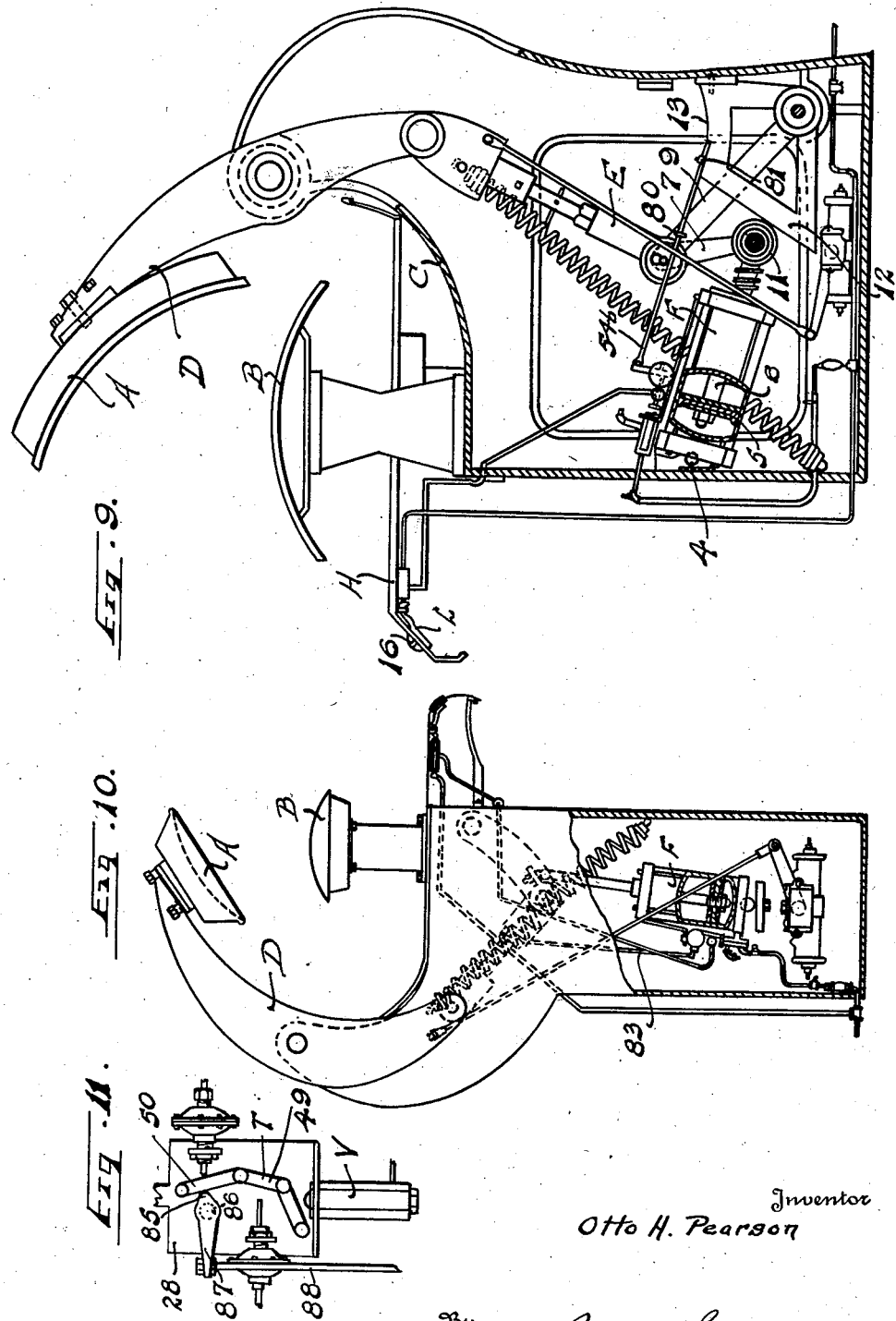

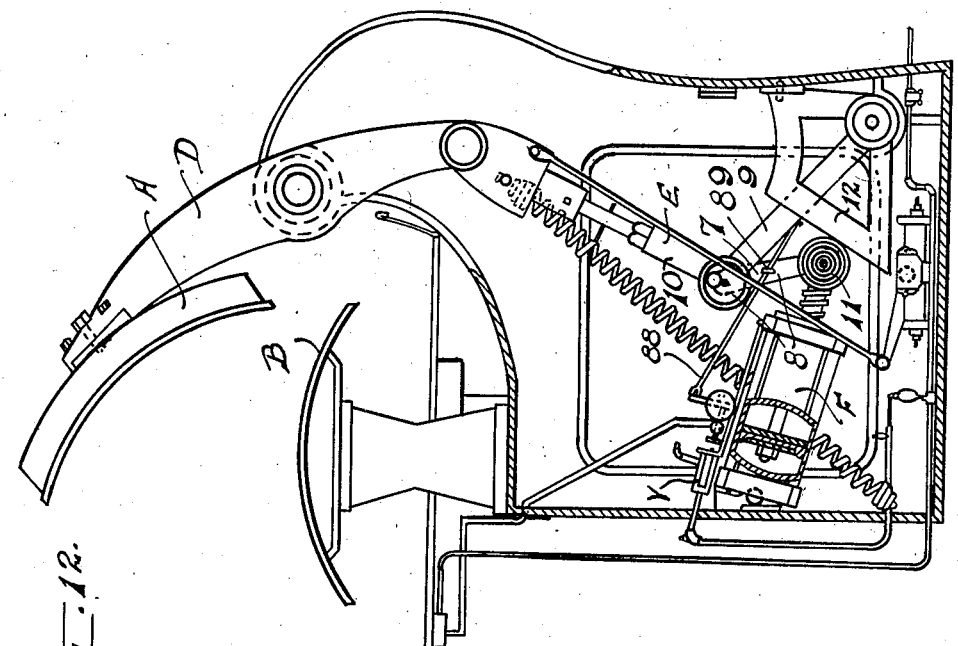

Patented Mar. 13, 1945

2,371,466

UNITED STATES PATENT OFFICE 2,371,466

CONTROL MECHANISM FOR PRESSING MACHINES

Otto H. Pearson, Salt Lake City, Utah, assignor to L. N. Strike, Salt Lake City, Utah Application October 4, 1941, Serial No. 413,656

5 Claims. (Cl. 38—40)

My invention relates to laundry presses and has for its object to provide a new and highly efficient two hand controlled laundry press which is positive and sure in its action, which locks the movable buck in the closed position until released manually or automatically and which incorporates many new and improved features never before found in such types of presses.

A still further object is to provide a new system of controlling the movable head in which a two-hand control system is combined with a diaphragm to operate an over center toggle operating the master valve and the press and to release the press by operating the toggle in the opposite direction, by a diaphragm with means, in the path of travel of the toggle to hold it from passing over center until the movable head has engaged the stationary buck or as regulated, to near the buck, depending upon the adjustment of the leverage.

A still further object is to provide a two hand control for pressing machines which when actuated operates a diaphragm, to shift a toggle, to operate a master valve, close the movable head; with the toggle held from passing over dead center until the operating machine of the press has reached a predetermined position at which time a barrier is removed from the path of the toggle and the head is locked in closed position.

A still further object is to provide a device as set out in the above objects in combination with an automatic release actuated by and due to the wear of the padding on the press and which will release the press upon the tilting of the power cylinder or by other means which will release a control toggle by the action of the lever which controls the barrier again throwing the toggle back to original position by the relative position of the lever and the relative position of the power cylinder.

In the drawings,

Figure 2 is a side elevation of a small type press, parts shown cut away, to show the operating mechanism.

Figure 3 is a diametrical section of the master valve.

Figure 4 is a diagrammatic view of the control system for the press showing the method of operating the toggle control for the master valve.

Figure 5 is a side elevation of the automatic timer device.

Figure 6 is a diagrammatic view of the control system used with the timer for automatically timing the period for holding the movable head engaging the pressing buck.

Figure 7 is a diametrical section of the mercury or fluid timer cylinder.

Figure 8 is a diametrical section of the control valve used in the timer.

Figure 9 is a side elevation of the press showing the method of operating the barrier attached to the operating toggle of the press.

Figure 10 is a side elevation of the small type press equipped in the same manner.

Figure 11 shows a modified manner of operating the toggle control.

Figure 12 shows a view of the press with the shaft lever attached to the leg of the crank member.

Figure 13 shows a modification of Figure 11.

Figure 14 is an end view of the operating toggle.

Figure 15 is an enlarged diagrammatic view showing the operation of the main valve toggle dotted lines indicating the position of the toggle when over center.

Figure 1:
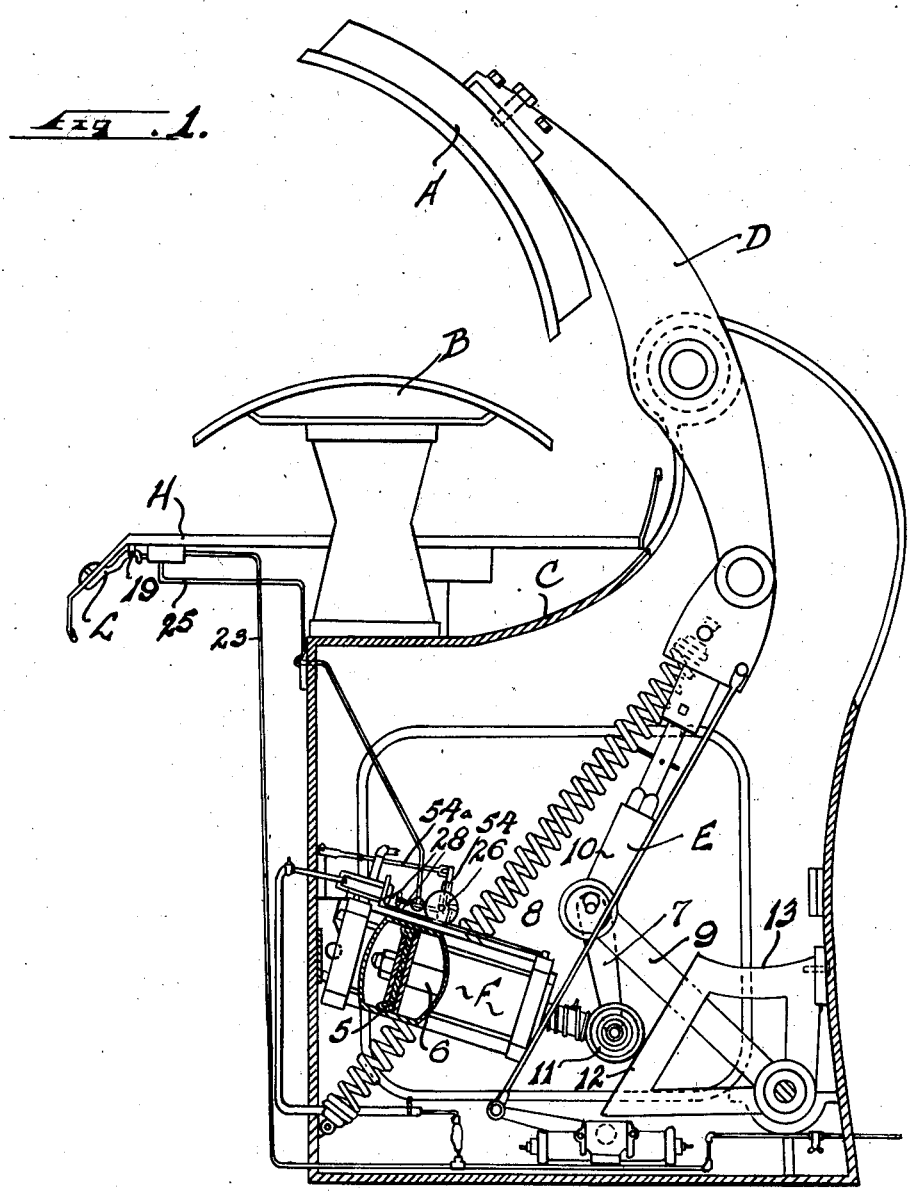
Figure 1 is a diagrammatic vertical section of a press, parts shown in elevation, showing how my controls are mounted.

In the drawings, I have shown my press with a movable pressing head A, and stationary buck B. The buck B is mounted on a framework C and the movable head is mounted on one end of a pivotally mounted pressing arm D. A toggle E operates the arm D and head A and a power cylinder F provides the power for the press.

The cylinder F is pivoted at one end by a pivot 4 and is provided with a piston 5 on the end of a piston rod 6. The outer end of the rod 6 is attached to a leg 7 of a crank member 8 which in turn is attached to the toggle E at the juncture of the lower arm 9 and upper arm 10. A set of rollers 11 is mounted on the end of the rod 6 adapted to roll up an inclined plane 12, the top of the plane being arc-shaped at 13 with the rollers adapted to follow the face of the plane incline 12 and then move over the arc 13 the final pressure being applied by the form of the crank member 8 which is not part of this invention having been covered in former copending patent applications.

Mounted at the front of the table H of the press are my control members. These consist of spaced manual buttons 15 and 16 for actuating the press and more closely spaced release buttons 17 and 18. These buttons are set above pivoted levers L all of which are alike and occur under all of the finger tip control buttons. The ease with which this press is operated is due to the controls thereof. The levers L are pivoted in suitable brackets 19 attached to the underside of the table H and in alignment with each lever there is one of my control valves. These valves are alike in form and shape, the only difference being in their sizes and as they are all alike I will describe the master valve only which is also like these valves, hereafter in this application.

These valves will for clarity be each given a different number and each performs its required function. The two outer valves or control valves 21 and 22 are attached in series. A pipe 23 leads fluid or air pressure from a source of supply (not shown) into the first valve 21 and through the ports of the valve when actuated by the finger of the operator through the pipe 24 to the next valve 22. From the valve 22 another pipe 25 leads to a toggle operating diaphragm 26. These two valves are so connected that when the valve 21 is pressed the pressure will pass through the valve to the next valve 22 but unless the second valve 22 is pressed the air stops there. If the second valve 22 is depressed simultaneously with the first valve 21 then the air actuates the diaphragm 26 operating the toggle lever 50 sufficiently to engage the arm 48 of the toggle T with the main control valve V sufficiently to open the valve for primary operation of the press. This is fully described hereinafter. This valve is mounted through the flanged end of a mounting plate 28 secured onto the top side of the lower cylinder F. The valve V as shown in Figure 3 is made of a casing 29 having a longitudinal bore therethrough having several diameters. A closure plug 27 is fitted into the end which is termed the pressure end in which the pipe line 23 is connected in the threaded hole 30. A chamber 32 is formed in this end of the cylinder by a valve seat partition 31. The chamber on the other side of the valve partition shown as a chamber 33 is in open connection with a port 34 which leads through a short nipple into the interior of the power cylinder F.

The chamber 33 merges into a larger diametered exhaust chamber 34' in which an exhaust port 36 is bored to discharge air from the cylinder after each operation thereof. In the end of this chamber 34' there is a threaded guide plug 37 through which an actuating rod 38 is passed. This rod 38 carries a spring held ball 38a in the end thereof to take up wear of the valves. A valve 41 is carried in the chamber 32 for controlling the pressure from the source of power and one side of the valve is provided with an extended stem 39 fitting into a socket 40 in the plug 27 for guiding the valve and a stem 43 is extended from the opposite side of the valve to control the valve. This valve 41 is of larger diameter than the stem and normally is held seated against the valve seat partition 31 by a spring 42. The chamber 33 extends on the other side of the valve 41 into the chamber 33. The main control valve 45 is of larger diameter and fits against the seat formed by the step of the larger diameter chamber 34' to the smaller diameter chamber 33. This valve 45 has one end formed as a small stem 46 to engage the stem 43 and open the valve 41 from the seat 31. The opposite side of the valve 45 is formed as a guide stem 47 fitting into the bore of the plug 38 to operate the valve assembly. This larger stem is engaged by the rod 38.

A three section toggle T is mounted so that one arm 48 engages the ball 38a to actuate the valve assembly when shifted by the movement of the other two arms 49 and 50. The three arms are pivotally attached to each other and one end of the arm 48 is pivotally attached to the plate 28 by a pivot 51. The outer arm of the toggle 50 is attached to the plate 28 by a pivot 52 and thus the central section of the toggle is attached to the other two members but is free to move. The toggle arm 50 is mounted near the actuating arm 53 of the diaphragm 26 thus when the diaphragm is actuated the toggle is actuated. The controls 15 and 16 must be manually held until such time as the barrier 56 is withdrawn and toggle T snaps over dead center into valve retaining position. The toggle is therefore a valve latching element which will be latched when the pressure mechanism reaches a predetermined position, but if the mechanism travels past this position (as when the padding is worn) the toggle is again unlatched and the valve released. This releases the press and warns the operator that new padding is needed. The master valve V is so mounted in relation to the toggle T that it may be operated even though the barrier prevents the toggle from overlocking. This is of course necessary in order to operate the press bringing the buck down to the head B operating the main toggle E by the movement of the cylinder F and piston 5 and the movement of the cylinder F actuates the lever 54a for removing the barrier 56.

A stop barrier for the toggle is provided to keep it from passing over dead center until desired and consists of a vertically mounted, partially rotatable crank rod 54 mounted in a cylinder base 55 which is attached to the plate 28. A ball 56 is movably carried in a recess in the crank rod 54 with one side of the ball extending to be engaged by the toggle arm 50 and prevent it moving further until the crank rod 54 has been partially rotated. A recess is formed in the rod 54 into which the ball 56 recedes when the rod has been partially rotated withdrawing the ball sufficiently for the toggle to pass over dead center. When this happens the head is held in pressing relationship with the buck until released by reverse action of the toggle. This is accomplished primarily by a diaphragm 58 mounted on the opposite side of the plate 28 with the shaft 59 of the diaphragm adapted to press against the central toggle arm 49. A pipe 60 leads to this diaphragm from a check valve coupling 61 which is connected by two pipes 62 and 63. The pipe 62 leads to one release valve 64 and the pipe 63 leads to the other release valve 65. These are the two release valves controlled by the finger controlled release buttons 17 and 18, and levers L and are mounted behind and under these buttons similar to the way the other valves are mounted to be actuated by the buttons 15 and 16 and the control levers L. When the release valves 64 and 65 are operated the air passing through the pipes 62, 63 and 60 actuates the diaphragm which in turn moves the toggle through the shaft 59 pressing against the lever 49. The movement of the toggle over center releases the valve and thereby releases the press. A pipe 67 connects the valve 64 with the source of fluid pressure through a coupling on the top of the valve 21 and this source of power is also connected to the valve 65 so that both valves are provided with air pressure or fluid pressure. Thus in the arrangement shown in Figure 4 the release valves may either one be utilized for releasing the press but in Figure 6 the valve 65 is shown for tandem purposes or in other words to release the next in a series of presses which may be set up in a semi-circle around the operator. For example three or four presses may be set up in a semi-circle using a single operator to control all of them and the release valve 65 on one press will release the next press in the semicircle.

The rotatable crank rod 54 has the crank end thereof attached to the framework by an adjustable link 54a so that any elevation or lowering of the free end of the power cylinder caused by the rollers passing up the incline 12 will change the relative position of the crank rod 54. This oscillation or tilting movement is the means for permitting the toggle to pass beyond dead center as the raising of the cylinder F causes the crank arm to partially rotate bringing the recess therein into alignment with the ball 56 permitting it to recede therein which withdrawing from the path of the toggle permits it to pass beyond dead center thus the relative movement of the cylinder F controls the position of the crank rod.

Should the padding become worn, so that the press when operating comes down too far, the rollers 11 passing above the arc 13 will travel too far allowing the cylinder end to be lowered after having been elevated for pressing action of the movable buck. This lowering of the free end of the cylinder F naturally reverses the movement of the crank rod 54 which changes the position of the recess therein causing the ball 56 to engage the lever arm 50 of the toggle instantly releasing the press by forcing the toggle back beyond dead center to its initial position exhausting the pressure from the cylinder F by releasing the master valve V.

The adjustment of the link 54a and of the arm 10 of the toggle E control the position of the pressing or movable buck when this action takes place.

To control the pressing head and automatically time the period for pressing I have provided a timer, which is shown in Figures 5 to 8 inclusive, and which timer regulates to any predetermined period the time for holding the head engaged with the buck.

The timer consists of an angle bracket 67 which is attached to the framework C of the machine and which bracket carries an extended bracket along the vertical side in the form of a letter L to the end of which a pressure diaphragm 68 is mounted. This diaphragm 68 is connected to the diaphragm 26 by a pipe 71. A cylinder 73 is mounted to the base of the bracket 67 and carries a piston 74 which piston is provided with ports 75 and vent control nut 76 with the head of the cylinder closed and a plug is screwed into the open end of the cylinder with the piston rod 77 passing through the plug to engage an actuating lever 78. The cylinder is filled with mercury or other suitable fluid and the time required for the fluid to pass through the ports in the piston controls the time of drop of the piston. The end of the lever 78 is turned down and engaged by the rod of the diaphragm 68. The lever is pivoted at 79 for fulcrum pivot and pressure by the diaphragm raises the outer longer end of the lever raising the piston in the mercury. A spring 80 is mounted adjustably to the end of the lever 78 with the tension of the spring pulling the end of the lever downwardly causing the piston to settle through the mercury and the speed of lowering of the outer end of the lever is governed by the tension of the spring and the size of the ports in the piston.

A valve 81 is mounted to the bracket 67 and the stem 82 of the valve 83 is engaged by an adjustable bolt 84 mounted through the lever 78 when it reaches a predetermined position and the position is adjusted by the predetermined time required or desired for holding the press closed. The valve may be of a type such as shown in Figure 3 or may be as shown in Figure 8 with a ball valve 85 held to its seat 86 by a spring 87. The stem 82 of the valve 83 passes out through a guide in the end of the valve 81 and the seat 86 of the ball valve is so made that when the valve is pressed away from the seat pressure will pass from one side to the other. A pipe 90 is connected in the port 91 in the master valve F by removing the plug 92 and inserting the end of the pipe into the threaded end of the port, and the pipe leads into the lower chamber 93 of the valve 81. The chamber above the valve seat is then connected through the check valve 61 to the diaphragm 58 by a pipe 94.

Figures 9 and 10 show the same general features as are found in the machines shown in Figures 1 and 2 with this difference. The rod 54a in Figure 1 is shown in Figure 9 as a lost motion rod 54b and the rod is passed through a pivotal stop 80 mounted on the lower arm 9 of the toggle mechanism and the rod 54b is provided with an adjustable stop 81 to control the position for removal of the barrier when the press has reached a predetermined position. This same barrier removal feature is shown in Figure 10 as a rod 83 actuated by the movable toggle of this press shown in dotted lines as 84.

This application is a continuation in part of my co-pending patent application for control mechanism for pressing machines, filed September 16, 1940, Serial Number 356,931, now Patent No. 2,332,830, dated October 26, 1943.

In Figure 11 I have shown a modified manner of operating the toggle T which consists of a cam 85 formed on one end of a pivoted lever 87. The base 86 of the lever shown in dotted lines is mounted rotatably in the mounting plate 28 so that movement of the lever is accomplished by engaging a rod 88 to the end of the lever and with the end of the rod 88 mounted to the framework or to the toggle as shown in Figures 1, 2, or 9 and 10. The cam or extended end of the lever acts as a barrier for the toggle T engaging the toggle arm 50 holding it from passing over center until the cylinder has been tilted sufficient to move the lever 87 by the rod 88 out of the way of the arm 50, or until the movable toggle or operating mechanism of the press has moved sufficient distance to shift the rod 88. This also acts to release the press in the event that the padding is worn as continued movement of the toggle E of the press or excessive tilting of the cylinder F of the press will, when the lever 87 is made as in Figure 13 with an additional cam, again release the press. When the lever is made with one cam continued movement will not release the press.

In Figure 12 I have shown a modification of my device in which the movement of the leg 7 of the crank member 8 is employed to release the press when the padding is worn. The crank member 8 is provided with a pivoted stop 89 through which the shift lever 88 or the lever 54a is passed. In this type of mounting, continued movement of the leg 7 or crank member 8 will again release the press by actuating the rod 88 and lever 87 which engages the lug 90 of the lever 87 with the lever 50 forcing it over dead center and automatically releasing the valve V.

Having thus described my invention I desire to secure by Letters Patent and claims:

1. A control for presses comprising, a movable head and stationary buck; operating mechanism thereof actuated by a power cylinder having one end pivotally mounted; spaced valves to control the press; a toggle mounted to be controlled by pneumatic means actuated by said spaced valves, said toggle controlling means to supply fluid to said cylinder; a lever mounted adjacent said toggle having a recess in one side thereof; a ball carried in a base mounted on the cylinder in which base the lever is mounted, said ball being adapted to engage in the recess when the lever is partially rotated to withdraw the ball as a barrier from the path of the toggle; means connecting the free outer end of the lever with the framework of the press so that the lowering oscillation of the cylinder will cause the lever to be partially rotated to control the barrier ball, operate the toggle and release the press.

2. A control for presses to automatically release the press when the padding has been worn too thin comprising, a movable head and stationary buck; operating mechanism for said movable head actuated by a pivoted power cylinder and toggle mechanism; valves by which said press is controlled; a toggle mounted on said power cylinder, means actuated by said latter toggle to control the supply of operating fluid to said cylinder; a ball barrier mounted in the path of said toggle; a lever for actuating the ball barrier to withdraw the ball barrier from the path of the toggle; and means connecting the lever with the framework of the press to withdraw the barrier upon a predetermined amount of movement and on continued pivoting of the power cylinder to release the toggle and thereby the movable buck.

3. A control for presses to automatically release the press when the padding has been worn too thin comprising, a movable head and stationary buck; operating mechanism for said movable head actuated by a pivoted power cylinder and toggle mechanism; valves by which said press is controlled; a toggle mounted on said power cylinder; means actuated by said latter toggle to control the supply of operating fluid to said cylinder; a ball barrier mounted in the path of said toggle; a recessed lever partially rotated by the pivoted power cylinder to withdraw the ball barrier from the path of the toggle; and means connecting the lever with the toggle mechanism of the press to withdraw the barrier upon a predetermined amount of movement.

4. A control for presses to automatically release the press when the padding has been worn too thin comprising, a movable head and stationary buck; operating mechanism for said movable head actuated by a pivoted power cylinder and toggle mechanism; valves by which said press is controlled; a toggle mounted on said power cylinder; means actuated by said latter toggle to control the supply of operating fluid to said cylinder; a lever barrier mounted in the path of said toggle; and means connecting the lever with the toggle mechanism of the press to withdraw the barrier upon a predetermined amount of movement of the movable head, and on continued pivoting of the power cylinder to release the toggle and thereby the movable buck.

5. A control for presses comprising a movable head and a stationary bed member; a toggle mechanism for operating said movable head; said toggle having a normal range of pressure applying positions but due to the packing down or wearing of the padding may reach a predetermined pressure applying position at which the pressure diminishes; and means to lock the head in engaged position with the bed member by the movement of the toggle mechanism, said means being operative in the latter position of the toggle mechanism to return the press to its fully open position.

OTTO H. PEARSON.